United States Patent [19]
Nip

[11] Patent Number: 5,728,359
[45] Date of Patent: Mar. 17, 1998

[54] METHOD FOR THE PREPARATION OF SODIUM AMMONIUM PHOSPHATE

[76] Inventor: Raymond L. Nip, 259 Sebastian Dr., Millbrae, Calif. 94030

[21] Appl. No.: 542,487

[22] Filed: Oct. 13, 1995

[51] Int. Cl.$^6$ ........................................... C01B 25/45
[52] U.S. Cl. .................................. 423/306; 423/312
[58] Field of Search ........................ 71/36; 423/306, 423/310, 308, 312

[56] References Cited

U.S. PATENT DOCUMENTS

| | | |
|---|---|---|
| 3,388,966 | 6/1968 | MacDonald . |
| 3,531,242 | 9/1970 | Hayakawa et al. ............ 423/306 |
| 3,619,133 | 11/1971 | Fukuba . |
| 3,957,955 | 5/1976 | Nicolaisen . |
| 3,965,245 | 6/1976 | Nicolaisen . |
| 4,117,089 | 9/1978 | Fujita et al. ............ 423/306 |
| 4,325,927 | 4/1982 | Weston et al. . |
| 4,632,813 | 12/1986 | Anastasi et al. ............ 423/310 |

OTHER PUBLICATIONS

Laskorin et al., Chemical Abstracts, vol. 88, No. 88: 155242w, corresponding to U.S.S.R. patent No. 588,183 (1978).
Golynko et al., Chemical Abstracts, vol. 97, No. 97: 25889n, corresponding to U.S.S.R. patent No. 916,389 (1982).
Korzhuev et al., Chemical Abstracts, vol. 112, No. 112: 190565q (1990).
Zotova et al., Chemical Abstracts, vol. 105, No. 105: 136389c (1986).

Primary Examiner—Wayne Langel
Attorney, Agent, or Firm—Oblon, Spivak, McClelland, Maier & Neustadt, P.C.

[57] ABSTRACT

Sodium ammonium phosphate and ammonium chloride are prepared from an ammonium phosphate (e.g., diammonium phosphate) and sodium chloride in water. The crystallization of sodium ammonium phosphate may take place between $-10°$ C. to $40°$ C. Using the present invention, technical grade sodium ammonium phosphate and ammonium chloride can be produced from fertilizer grade diammonium phosphate.

28 Claims, 2 Drawing Sheets

METHOD FOR THE PREPARATION OF SODIUM AMMONIUM PHOSPHATE

BACKGROUND OF THE INVENTION

1. Field of the Invention

The present invention concerns a method for producing very pure sodium ammonium phosphate from, for example, fertilizer grade diammonium phosphate, which is very impure. The present method involves reacting an ammonium phosphate (e.g., diammonium phosphate) with sodium chloride, preferably in aqueous media. The present method may further comprise crystallizing the formed sodium ammonium phosphate to further enhance the purity of the sodium ammonium phosphate. The sodium ammonium phosphate produced using the present method can be further processed into various industrial, food, or feed grade sodium orthophosphates, pyrophosphates, or polyphosphates by methods such as those disclosed in U.S. Pat. No. 3,965,245 (the entire contents of which are incorporated herein by reference).

2. Discussion of the Background

It is known that sodium ammonium phosphate can be prepared by the following methods:

(1) Reacting sodium hydroxide with monoammonium phosphate according to the following equation:

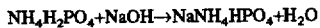

$$NH_4H_2PO_4 + NaOH \rightarrow NaNH_4HPO_4 + H_2O$$

(2) Reacting sodium carbonate with monoammonium phosphate according to the following equation:

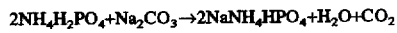

$$2NH_4H_2PO_4 + Na_2CO_3 \rightarrow 2NaNH_4HPO_4 + H_2O + CO_2$$

In most cases, fertilizer grade diammonium phosphate is very impure and is not suitable for industrial uses, animal feed, or human consumption. Thus, the purity of any product made using fertilizer grade diammonium phosphate is a concern.

While monoammonium phosphate can be made into sodium ammonium phosphate, it has the following disadvantages. Fertilizer grade monoammonium phosphate can be difficult to purify, while technical grade monoammonium phosphate is very expensive. Furthermore, monoammonium phosphate is more corrosive to equipment than diammonium phosphate. It is also less available commercially.

In addition, the above methods involve either the use of highly caustic reagents (e.g., NaOH) or reagents which may lead to fouling of reactor equipment (e.g., precipitates formed by reaction of, for example, $HCO_3^-$ or $CO_3^{2-}$ with heavy metal impurities). Thus, the need for a method which does not involve highly caustic reagents and/or complicated purification procedures is strongly felt.

In U.S. Pat. No. 3,957,955, a method is proposed to produce sodium ammonium phosphate, free of carbon dioxide, from monoammonium phosphate and sodium carbonate. No removal of other impurities is involved. The method thus most likely does not and/or cannot remove impurities like fluorine, sulphate, etc.

It is also known that ammonium chloride and sodium sulphate can be produced from ammonium sulphate and salt (NaCl). According to this reaction, one would expect to produce disodium phosphate and ammonium chloride from sodium chloride and diammonium phosphate if the Na/P molar ratio is 2.

SUMMARY OF THE INVENTION

Accordingly, one object of the present invention is to provide a novel method for producing sodium ammonium phosphate which does not involve the use of highly caustic reagents.

A further object of the present invention is to provide a novel method for producing sodium ammonium phosphate which can avoid reagents which form insoluble precipitates and which can avoid complicated purification procedures.

It is a further object of the present invention to provide a novel method for producing sodium ammonium phosphate which reduces the costs of manufacture and which may also produce a valuable by-product (e.g., ammonium chloride, liquid fertilizer, etc.).

These and other objects of the present invention, which will be readily understood in the context of the following detailed description of the preferred embodiments, have been provided by a method for producing sodium ammonium phosphate, comprising reacting an ammonium phosphate with sodium chloride in a reaction medium, and isolating the formed sodium ammonium phosphate.

DESCRIPTION OF THE PREFERRED EMBODIMENTS

Figure 1:
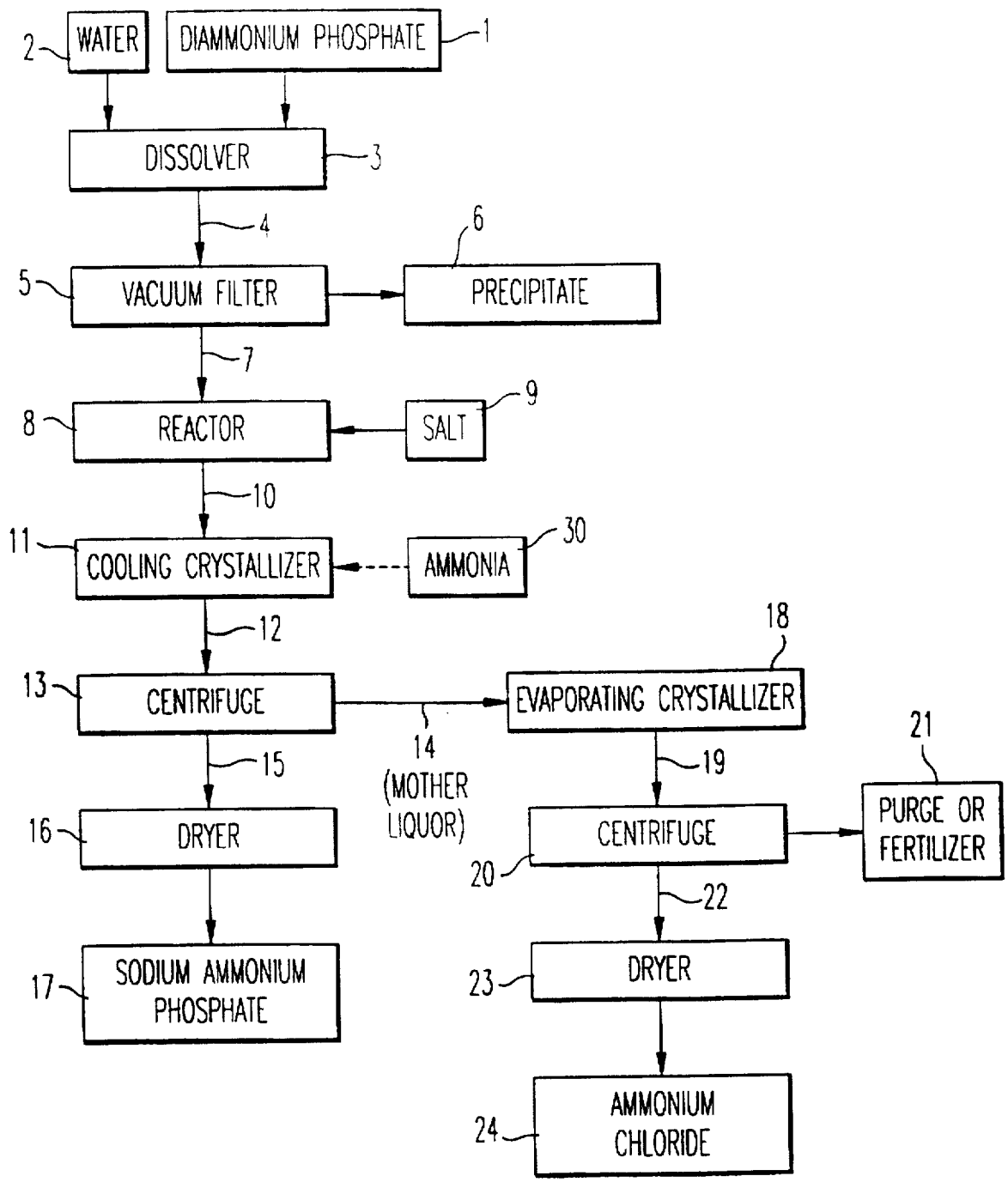
FIG. 1 is a flow diagram showing the preparation of sodium ammonium phosphate and ammonium chloride. The blocks show basic and/or optional steps and may describe equipment used in the method. Arrows show material and/or reagent supply and product flow and removal.

Contrary to the expectation which one would have from the product formed by reacting sodium chloride with ammonium sulphate, only sodium ammonium phosphate is produced from reacting an ammonium phosphate with sodium chloride, despite the fact that the Na/P molar ratio may be varied from 0.25 to 2.5.

Thus, the present invention concerns a method of producing sodium ammonium phosphate (SAP), comprising the steps of (a) reacting an ammonium phosphate with sodium chloride in a reaction medium, and (b) isolating the sodium ammonium phosphate formed during the reaction. In preferred embodiments, the reaction medium comprises an aqueous medium, and the isolating step comprises crystallizing the sodium ammonium phosphate formed during the reaction.

In the context of the present application, the reaction medium may comprise an aqueous medium (e.g., water, alone or and mixed with a water-soluble lower alcohol, glycerol, acetone, dimethylformamide, hexamethylphosphoric triamide, or mixture thereof). Additionally, the pH of the aqueous medium may be adjusted to a desired value with a suitable mineral acid or base (e.g., phosphoric acid, hydrochloric acid, ammonium hydroxide, NaOH, NaHCO_3, $Na_2CO_3$, etc.). However, the preferred reaction medium is water.

In further embodiments of the present method, the reacting step comprises dissolving the ammonium phosphate in an amount providing a $P_2O_5$ content of from 4% to 25%, preferably from 8% to 20%. The $P_2O_5$ content of a solution or composition containing tri-, di- and/or monobasic phosphate is calculated in accordance with known methods.

The reacting step may be conducted for a length of time sufficient to mix or substantially dissolve the reactants (ammonium phosphate and sodium chloride). For example, when the method further comprises a crystallizing step, the crystallizing step may be begun as soon as the reactants have substantially dissolved. However, the reacting step may be conducted for a length of time of at least 5 minutes, preferably at least 15 minutes, and more preferably at least 30 minutes, up to a length of time of 48 hours, more preferably 24 hours and even more preferably 12 hours. Most preferably, however, the reaction time is short, on the order from 10 minutes to one hour.

The present invention can be achieved by reacting, for example, fertilizer grade diammonium phosphate with sodium chloride in water. Both diammonium phosphate and sodium chloride can be in either solid form or in solution prior to the reaction. Most impurities from both the ammonium phosphate and sodium chloride can be wholly or partially removed before or after the reacting step (e.g., after one or more reactants are substantially dissolved in the reaction medium) by conventional filtration or sedimentation. The preferred method is to dissolve the reactants, either individually or in combination, and remove any insoluble impurities prior to isolating the sodium ammonium phosphate. Thus, most of the impurities from diammonium phosphate may be removed before the reaction, but it is also possible to remove impurities after the reaction.

The molar ratio of sodium chloride to diammonium phosphate, or the Na/P molar ratio, in the reaction is desirably in the range 0.25–3, advantageously 0.8–1.2, and more preferably 0.9–1.1.

The reaction medium may be heated or warmed to maintain it within a desired temperature range and to aid dissolution of reactants. Thus, the reaction temperature is preferred to be in the range of from 10° C. up to the boiling point of the medium, as long as ammonia loss is kept at reasonable levels. At reaction temperatures where ammonia loss is appreciable, the ammonia may be recovered and recycled to the reaction medium. However, preferred temperature ranges for conducting the reacting step are from 10° C., preferably 20° C., and more preferably from 30° C. up to a temperature of 80° C., preferably 70° C., and more preferably 60° C.

In the present method, the ammonium phosphate may be mono-, di- or triammonium phosphate, or a mixture thereof, or a combination of (a) ammonia or ammonium hydroxide solution with (b) phosphoric acid or a non-ammonium salt thereof (sodium preferred). When the ammonium phosphate is a mixture of ammonia or ammonium hydroxide with phosphoric acid, ammonium phosphates are generated in situ. The formation of mono-, di- and/or tribasic ammonium phosphates can be controlled in accordance with known methods. Preferably, the ammonium phosphate is monoammonium phosphate or diammonium phosphate, and most preferably, diammonium phosphate.

Diammonium phosphate, especially impure fertilizer grade diammonium phosphate commercially labeled as 18% N and 20% P, reacts with sodium chloride in a reactor containing water as a reaction medium to produce substantially pure sodium ammonium phosphate, suitable for subsequent conversion to sodium orthophosphates, polyphosphates and pyrophosphates. Thus, the present invention also concerns a method of producing food grade sodium phosphate, the improvement comprising using the sodium ammonium phosphate produced by the present method as a starting material, without purifying said sodium ammonium phosphate to remove As, F and heavy metal impurities (see U.S. Pat. No. 3,965,245, the entire contents of which are incorporated herein by reference, for methods of producing industrial, food, or feed grade sodium orthophosphates, pyrophosphates, or polyphosphates). Ammonium chloride is also produced as a by-product of the present method (see the discussion below).

The diammonium phosphate can be obtained from commercial sources in the Philippines, Mexico or the USA, etc. (e.g., fertilizer grade diammonium phosphate [18% N, 46% $P_2O_5$], available from The Siam Chemical Co., Ltd., Bangkok, Thailand; or technical grade diammonium phosphate [21% N, 53% $P_2O_5$], available from MC Industrial Chemical Co., Ltd., Bangkok, Thailand). It can be first dissolved in aqueous solution and then filtered or decanted to remove insoluble impurities. The solution can be very concentrated as long as the chloride content in the subsequent sodium ammonium phosphate is at a reasonable level (e.g., 1% or less, preferably 0.5% or less). For example, the $P_2O_5$ content of the diammonium phosphate solution is desirably at 20% or below if the subsequent crystallization temperature for sodium ammonium phosphate is at 0° C. (to keep the chloride content low).

Technical grade NaCl is available from K.C. Salt International Co., Ltd., Bangkok, Thailand. Also suitable for use in the present invention as sources of sodium chloride are commercially available rock salt and/or sea salt. Sodium bromide may be substituted for or mixed with sodium chloride in the present invention. However, due to the cost of sodium bromide, sodium chloride alone is preferred.

In a further embodiment of the present method, the isolating step comprises crystallizing the sodium ammonium phosphate to form sodium ammonium phosphate crystals, then separating the sodium ammonium phosphate crystals from the remainder of the reaction medium. The separating step may comprise centrifuging or filtering the sodium ammonium phosphate crystals.

Although SAP may begin to crystallize immediately (concurrently with the reacting step), crystallizing may be conducted by cooling the reaction medium over the course of at least 1 hour, more preferably at least 3 hours, and even more preferably at least 6 hours. Crystallizing may be conducted at a temperature of from −10° C. to 40° C., preferably at a temperature of from −10° to 20° C.

Very pure sodium ammonium phosphate tetrahydrate may crystallize from the reaction medium and from other solutions containing SAP, depending on the temperature, concentration of the reactants and subsequent rate of cooling, if any.

When the present isolating step comprises crystallizing SAP, the crystallization temperature may be in the range of from −10° C. to 40° C., preferably from −10° C. to 25° C. and more preferably from −10° C. to 10° C., with preference for lower temperatures (but without freezing the slurry). Crystallizing may be conducted batchwise, semi-batchwise, semi-continuously or continuously. Continuous crystallization can be conducted using a conventional cooling crystallizer or a conventional evaporating crystallizer, in accordance with known methods and equipment.

The sodium ammonium phosphate crystals may be isolated by filtration or centrifugation. The isolated crystals may be dried, and the separated mother liquor may be concentrated by evaporating the liquid component(s) of the mother liquor. Very pure ammonium chloride can be crystallized from the mother liquor, either by cooling the mother liquor or evaporating the liquid component(s) of the mother liquor as described above. The remaining solution can be purged and used as a liquid fertilizer for plants, providing nitrogen and phosphorous nutrients substantially without potassium (K).

The present method advantageously produces technical grade sodium ammonium phosphate in accordance with the industry-accepted definition of "technical grade sodium ammonium phosphate".

The present method may further comprise the step of adjusting the pH of the reaction medium or crystallization mixture to a value of 7 or greater, preferably from 7 to 12, and preferably after the reacting step and prior to the isolating step. The pH may be adjusted by adding ammonia, NaOH, $Na_2CO_3$ or a mixture thereof to the ammonium phosphate and sodium chloride. This embodiment is particularly advantageous when the ammonium phosphate is monoammonium phosphate, since mixtures containing monoammonium phosphate have a low pH relative to mixtures containing diammonium phosphate, and SAP is formed (e.g., by crystallization) most efficiently at relatively high pH (e.g., at a value of from 7 to 12).

In a further embodiment of the present method, the ammonium phosphate is fertilizer grade diammonium phosphate, the sodium chloride is rock salt or sea salt, the reaction medium comprises water, and the method further comprises the step of filtering an aqueous solution of the diammonium phosphate and sodium chloride prior to the isolating step.

The isolating step of present method may comprise separating the formed sodium ammonium phosphate from a mother liquor, in which case the method may further comprise the steps of:

concentrating the mother liquor to form ammonium chloride and concentrated mother liquor, and recovering the formed ammonium chloride from the concentrated mother liquor.

Referring to FIG. 1, which outlines a preferred embodiment of the present method, a dissolver or mixer providing good agitation 3 of any suitable size is used to dissolve diammonium phosphate in water. The dissolving process can be batch, continuous, or semicontinuous. Care has to be taken such that all soluble $P_2O_5$ is dissolved. Water 2 and diammonium phosphate 1 are metered in suitable proportions into the dissolver 3. The reactants are mixed by heavy agitation. The slurry 4 is then sent to a vacuum filter or clarifiers 5 to get rid of insoluble materials. The insoluble material can be washed to recover remaining $P_2O_5$ (phosphate), and the wash water can be returned to the dissolver while the remaining precipitate 6 is discarded.

The clear diammonium phosphate solution 7 is then sent to a reactor 8 where technical grade sodium chloride, or salt, is metered in and reacted. A small amount of heat of reaction may be generated. The reactor 8 can be heated up to the boiling point of the reaction medium, as long as ammonia loss is kept to a reasonable level. Alternatively, any ammonia lost may be captured and returned to the reactor and/or crystallizer before crystallization of sodium ammonium phosphate is completed. Heating may not be necessary, especially at low reactant concentrations.

The resulting slurry 10 may then be sent to a cooling crystallizer 11 and cooled to a low temperature, for example, -5° C., and the cooled slurry 12 may be centrifuged in centrifuge 13. The slurry and/or centrifuged crystals may be washed, for example, with ice-cold water, methanol, ethanol, acetone, other low molecular weight, water-miscible solvent, or with any mixture thereof. The crystallization temperature should be as low as possible to get a better yield of sodium ammonium phosphate, but may also be well above the freezing point of the slurry.

To compensate for any lost ammonia resulting from heating at reactor 8 or from an alkalinity deficiency in the diammonium phosphate 1, ammonia 30 may optionally be added at crystallizer 11 to increase the yield of sodium ammonium phosphate.

The sodium ammonium phosphate crystals 15 from centrifuge 13 may be dried at dryer 16. The dried sodium ammonium phosphate 17 can be packaged for sale or stored for subsequent conversion to sodium orthophosphate, sodium polyphosphates, or sodium pyrophosphates.

The mother liquor 14 from centrifuge 13 may be sent to an evaporating crystallizer 18 to be concentrated and to crystallize out ammonium chloride. The crystallization temperature may be maintained at a temperature at which crystals of ammonium chloride are formed. The ammonium chloride crystallization temperature (in the evaporating crystallizer 18) can advantageously be anywhere from 10° C. to the boiling point of mother liquor 14. The crystallization temperature, however, may also depend on the concentration of other ions like phosphate, sodium or sulphate. If substantially pure ammonium chloride is desired, the crystallization temperature should be controlled in such a way that very little or no phosphate, sulphate or sodium crystallizes out with the ammonium chloride (as discussed above).

The ammonium chloride slurry 19 from the crystallizer 18 may then be centrifuged at centrifuge 20 and be discharged as ammonium chloride crystals 22 into dryer 23. The dried ammonium chloride 24 may then be packaged for sale.

Mother liquor 21 from centrifuge 20 is rich in phosphates and nitrogen. It can be used as liquid fertilizer for plants which are not sensitive to chloride ions, or it can be recycled to the reaction medium until impurities such as sulphate reach unacceptable levels, at which point the mother liquor may be discarded. Thus, the present invention also concerns a method of producing a liquid fertilizer, comprising the present method of producing SAP and ammonium chloride, further comprising the step of isolating the concentrated mother liquor to produce the liquid fertilizer.

Figure 2:
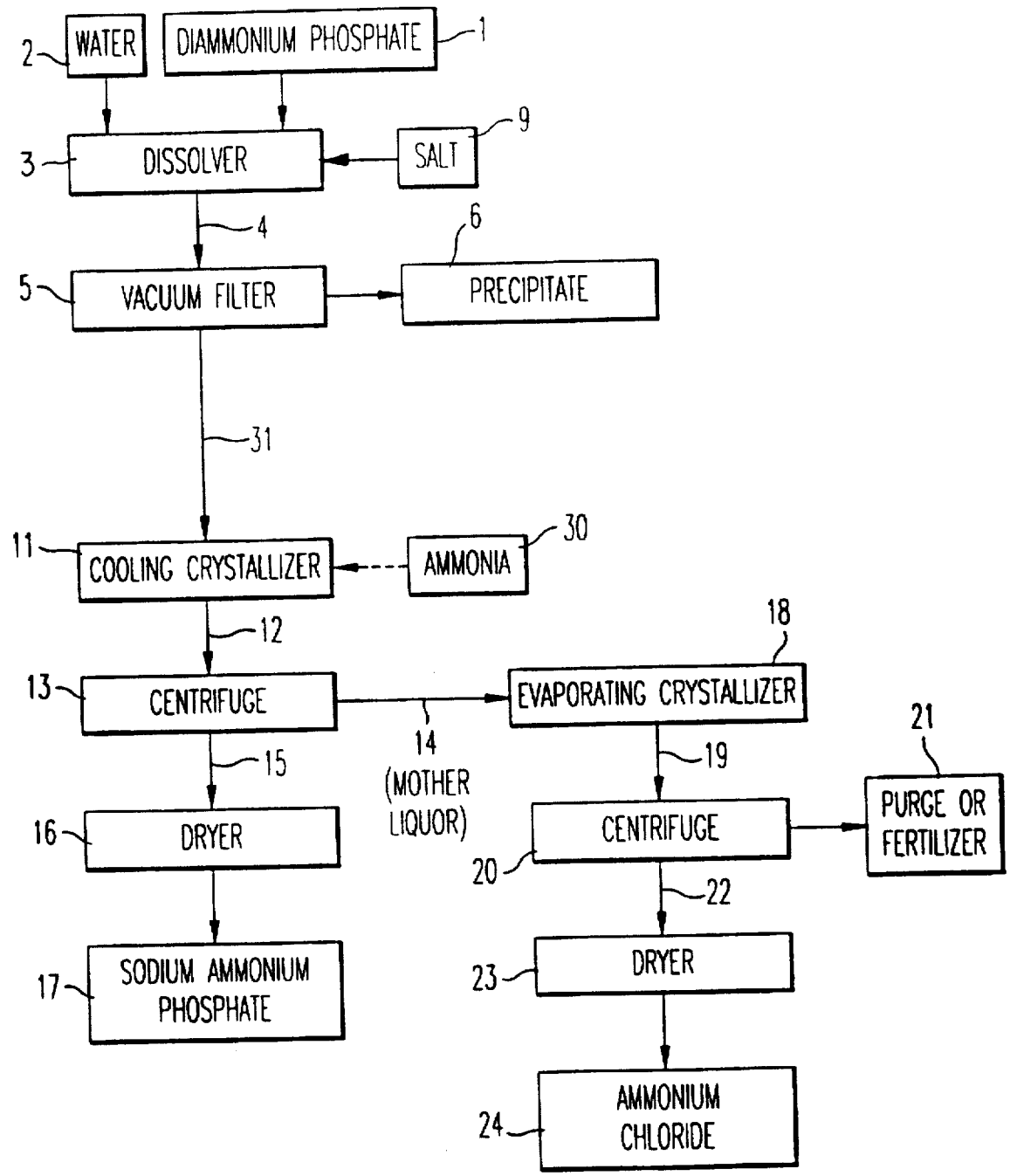
FIG. 2 is also a flow diagram showing the preparation of sodium ammonium phosphate and ammonium chloride in accordance with an alternative embodiment of the present invention. Arrows show the supply or removal of compounds, reactants, products or media. The dashed line represents optional addition of ammonia.

FIG. 2 is another flow diagram showing the preparation of sodium ammonium phosphate and ammonium chloride in a similar embodiment as that diagrammed in FIG. 1. However, sodium chloride 9 is added directly to the dissolver 3 instead of the reactor 8, as shown in of FIG. 1. Dissolver 3 acts as the reactor for the process diagrammed in FIG. 2.

Referring to FIG. 2, a dissolver or mixer 3 of any suitable size providing good agitation is used to dissolve, for example, the diammonium phosphate 1 in water. The dissolving process can be batch, continuous, or semicontinuous. Sodium chloride 9 can be added before, together with, or after the addition of the ammonium phosphate 1. Care may be taken to maintain a suitable temperature in the system so that sodium ammonium phosphate does not crystallize out at this stage, and such that all soluble $P_2O_5$ is dissolved. Water 2 and diammonium phosphate 1 are metered in suitable proportions into the dissolver 3. The reactants are mixed by heavy agitation. The slurry 4 is then sent to a vacuum filter or clarifiers 5 to get rid of insoluble materials. The insoluble material can be washed to recover remaining $P_2O_5$ (phosphate), and the wash water may be returned to the dissolver 3 while the remaining precipitate 6 is discarded.

The filtrate 31, which contains sodium chloride, may be sent directly to the cooling crystallizer 11. All remaining steps may be performed exactly as described above and shown in FIG. 1, at and after the cooling and/or crystallizing steps.

The dried sodium ammonium phosphate 17 will have an approximate formula $Na_x(NH_4)_yH_z(PO_4) \cdot uH_2O$. Usually x is from 0.8 to 1.1 when the Na/P molar ratio is from 0.8:1 to 2:1 (in the reacting step). Preferably, x is from 0.9 to 1.1, y is from 0.9 to 1.1, z is equal to 3−(x+y), and u is generally about 4. This represents a sodium ammonium phosphate tetrahydrate. However, if the pH during the crystallizing step is maintained at a value from 7 to 12, y is usually a value from 0.9 to 1.5. Of course, this assumes that no substantial inclusion of ammonium chloride, sodium chloride, and diammonium phosphate exists. Thus, the SAP produced by the present invention may be of very high purity (e.g., where the levels of impurities may be no greater than the following: Fe, no greater than 25 ppm, preferably no greater than 15 ppm, and more preferably no greater than 10 ppm; F, no greater than 400 ppm, preferably no greater than 250 ppm and more preferably no greater than 100 ppm; heavy metals as Pb, no greater than 10 ppm; and chloride, no greater than 0.6%, preferably no greater than 0.5%, and more preferably no greater than 0.4%).

Other features of the present invention will become apparent in the course of the following descriptions of exemplary embodiments which are given for illustration of the invention, and are not intended to be limiting thereof.

EXAMPLES

In the following examples, the percentages of $P_2O_5$ and $NH_4$ were analyzed in accordance with Bassett, "Vogel's Textbook of Quantitative Inorganic Analysis," 4th ed. (1987), Longman Group, Ltd. The percentages of Fe, As, $SO_4$ and heavy metals (as Pb) were analyzed in accordance with Rosin, "Reagent Chemical and Standards with Method of Testing and Assaying," 5th ed. (1967), Van Nostrand Co., Inc. The percentages of Na, Cl and F were analyzed using ion selective electrodes, manufactured by Cole-Parmer Instrument Co., Niles, Ill.

Example 1

Technical grade diammonium phosphate with the following composition was reacted with technical grade sodium chloride in different Na/P molar ratios:

| | |
|---|---|
| $P_2O_5$, % | 53 |
| N, % | 21 |
| Fe, % | 15 |
| $SO_4$, % | 0.86 |
| As, ppm | 3 |
| F, ppm | 2900 |
| Heavy Metal as Pb, ppm | <10 |
| Chloride, % | 0.05 |
| Na, % | 0.014 |

The above diammonium phosphate is made into a 11.4% $P_2O_5$ solution (Solution 290). Separate samples of Solution 290 were mixed at room temperature (between 20° and 30° C.) with different amounts of technical grade sodium chloride, agitated vigorously until the sodium chloride dissolved, and cooled to −8° C. overnight as follows:

| Sample | 291 | 292 | 293 |
|---|---|---|---|
| Solution 290, grams | 450 | 450 | 450 |
| NaCl, grams | 34 | 42 | 50 |
| Na/P molar ratio | 0.8 | 1 | 1.2 |
| total weight, grams | 484 | 492 | 500 |

After cooling to −8° C., the slurry was centrifuged. The sodium ammonium phosphate was weighed (grams):

| Sample | 291 | 292 | 293 |
|---|---|---|---|
| Weight (grams) | 106 | 124 | 132 |

Composition of the SAP crystals:

| SAMPLE | 291 | 292 | 293 |
|---|---|---|---|
| $P_2O_5$, % | 33 | 34 | 35 |
| Na, % | 11 | 11 | 11 |
| $NH_4$, % | 8.7 | 8.8 | 8.9 |
| Na/P molar ratio | 1.0 | 0.99 | 1 |
| F, ppm | 54 | 56 | 55 |
| Fe, ppm | 4 | 6 | 6 |
| As, ppm | <1 | <1 | <1 |
| Heavy Metal as Pb, ppm | <10 | <10 | <10 |
| $SO_4$, % | 0.0008 | — | — |
| Cl, % | 0.35 | 0.42 | 0.48 |
| pH of 1% solution | 8.0 | 8.0 | 8.0 |
| % of $P_2O_5$ recovered in sodium ammonium phosphate crystals | 68 | 82 | 89 |

Example 2

A commercial grade diammonium phosphate fertilizer (DAP, N 18%, P 20%) with the following composition was used as the starting material:

| | | | |
|---|---|---|---|
| $P_2O_5$ | 46% | Chloride | 0.13% |
| Water Soluble $P_2O_5$ | 42% | $SO_4$ | 7.4% |
| N | 19% | Fe | 0.3% |
| F | 1.8% | Water Soluble Heavy Metal (as Pb) | <20 ppm |
| As, ppm | <10 ppm | | |
| Na | 0.29% | Water Insoluble Materials | 10% |

Other impurities, such as Al, silica, etc., exist but have little effect on the final products.

The above fertilizer grade diammonium phosphate was mixed with water in a weight ratio of one part of the fertilizer to three parts of water with good agitation. The solution was vacuum filtered.

The clear solution was poured into a container (Solution No. 340) with the following composition and properties:

| | | | |
|---|---|---|---|
| $P_2O_5$ | 11% | Chloride | 0.027% |
| N, % | 4.7% | $SO_4$ | 1.7% |
| F, ppm | 1700 | Fe | 20 ppm |
| As, ppm | 4 ppm | Heavy Metal (as Pb) | <20 ppm |
| Na, % | 0.068% | Specific Gravity | 17 Be' |

Technical grade sodium chloride in solid form was added to separate samples of the above solution to achieve Na/P molar ratios of 0.8, 1, 1.2 and 2, respectively. The reactions were carried out at room temperature and atmospheric pressure with good agitation. Heat is generated during the reaction, and there was a slight temperature rise. The mixtures were then cooled to −8° C. overnight to crystallize sodium ammonium phosphate. Samples 341, 342 and 343 contained a small quantity of ice, due to the dilute solution and low temperature used. The resulting crystals were centrifuged and weighed.

| SAMPLE | 341 | 342 | 343 | 344 |
|---|---|---|---|---|
| DAP Solution 340 (11% $P_2O_5$), grams | 450 | 450 | 450 | 450 |
| total $P_2O_5$ in solution, grams | 50 | 50 | 50 | 50 |
| NaCl added, grams | 30 | 38 | 46 | 76 |
| Na/P molar ratio | 0.8 | 1 | 1.2 | 2 |
| total crystals after centrifuging, grams | 97 | 112 | 118 | 125 |

Sodium ammonium phosphate crystal composition properties:

| | | | | |
|---|---|---|---|---|
| $P_2O_5$, % | 33 | 33 | 34 | 33 |
| Na, % | 11 | 11 | 11 | 11 |
| $NH_4$, % | 8.6 | 9.1 | 8.6 | 8.8 |
| Na/P molar ratio | 0.99 | 1.01 | 0.99 | 1.04 |
| F, ppm | 100 | 150 | 280 | 220 |
| Fe, ppm | 4 | 10 | 10 | 6 |
| As, ppm | 3 | 4 | 4 | 5 |
| Heavy Metal (as Pb), ppm | <10 | <10 | <10 | <10 |
| $SO_4$, % | 0.17 | 0.34 | 0.49 | 0.17 |
| Cl, % | 0.19 | 0.38 | 0.51 | 0.58 |
| pH of 1% solution | 8.01 | 8 | 8.01 | 8.01 |
| % of $P_2O_5$ recovered in sodium ammonium phosphate crystals | 66 | 78 | 84 | 86 |

Example 3

The fertilizer grade diammonium phosphate in Example 2 was mixed with water in a weight ratio of one part of the fertilizer to three and one-half parts of water. Sodium chloride was added at a temperature slightly above 40° C. with good agitation, and the resulting solution was then filtered while still hot to produce Solution 331I.

| | sample 331I |
|---|---|
| Fertilizer grade diammonium phosphate, grams | 150 |
| water, grams | 525 |
| sodium chloride, grams | 53 |
| total weight, grams | 728 |
| filtrate (solution 331I) weight, grams | 637 |
| filtrate (solution 331I) composition properties: | |
| $P_2O_5$, % | 8.5 |
| Na, % | 3.0 |
| $NH_4$, % | 5.4 |
| F, ppm | 810 |
| As, ppm | 2 |
| $SO_4$, % | 1.4 |
| Chloride, % | 3.8 |
| Fe, ppm | 4 |

450 grams of Solution 331I were cooled to −10° C. A slurry formed over the course of 6 hours and was centrifuged to produce sodium ammonium phosphate crystals having the following properties:

| | |
|---|---|
| Solution 331I, grams | 450 |
| weight of the SAP crystals obtained, grams | 95 | composition of the obtained SAP crystals:

| | |
|---|---|
| $P_2O_5$, % | 32 |
| Na, % | 11 |
| $NH_4$, % | 8.8 |
| Na/P molar ratio | 1.04 |
| F, ppm | 54 |
| Fe, ppm | 3 |
| As, ppm | 3 |
| Heavy Metal (as Pb), ppm | <10 |
| $SO_4$, % | 0.21 |
| Cl, % | 0.28 |
| pH of 1% solution | 8 |
| % of $P_2O_5$ recovered in sodium ammonium phosphate crystals | 80 |

Example 4

The procedure of Example 2 was followed. The yield of sodium ammonium phosphate, with or without addition of ammonium hydroxide (with vigorous stirring) and/or at different crystallization temperatures, was determined. Fertilizer grade diammonium phosphate was dissolved in water as in Example 2, filtered and divided into 3 samples (181, 182, and 183).

| SAMPLE | 181 | 182 | 183 |
|---|---|---|---|
| DAP Solution (10% $P_2O_5$), grams | 450 | 450 | 450 |
| NaCl added, grams | 38 | 38 | 38 |
| 27% $NH_3$ solution added, grams | 20 | — | — |
| total weight, gram | 508 | 488 | 488 |
| Cooling over the course of about 3 hours to crystallize SAP (°C.) | 2° C. | 2° C. | 20° C. |
| total SAP crystals after centrifuging, grams | 108 | 98 | 69 |

Sodium ammonium phosphate crystal properties:

| Sodium ammonium phosphate crystal properties: | | | |
|---|---|---|---|
| $P_2O_5$, % | 34 | 33 | 33 |
| Na, % | 9.3 | 11 | 10 |
| $NH_4$, % | 11 | 8.9 | 8.7 |
| Na/P molar ratio | 0.84 | 0.98 | 0.97 |
| F, ppm | 110 | 120 | 99 |
| Fe, ppm | 15 | 10 | 5 |
| As, ppm | 4 | 5 | 3 |
| Heavy Metal (as Pb), ppm | <10 | <10 | <10 |
| $SO_4$, % | 0.56 | 0.45 | 0.32 |
| Cl, % | 0.35 | 0.35 | 0.31 |
| pH of 1% solution | 8.6 | 8.2 | 8.2 |
| % of $P_2O_5$ recovered in sodium ammonium phosphate crystals | 81 | 71 | 50 |

Example 5

To illustrate the purification effects of the present invention, a fertilizer grade diammonium phosphate (N 18%, P 20%) with the following composition was dissolved in water and filtered to produce Solution 120. 1350 grams of Solution 120 was reacted with 114 grams of sodium chloride and 54 grams of 27% ammonium hydroxide. The slurry was cooled to −6° C. overnight to crystallize sodium ammonium phosphate, and the crystals were centrifuged. 348 grams of sodium ammonium phosphate was obtained. The sodium ammonium phosphate crystals and the above items have the following compositions:

|  | fertilizer grade DAP | Solution 120 | Sodium Ammonium Phosphate |
|---|---|---|---|
| $P_2O_5$, % | 46 | 11 | 35 |
| water soluble $P_2O_5$, % | 42 | N/A | N/A |
| $NH_4$, % | 24 (N 19%) | 4.7 | 12 |
| Fe, ppm | 3000 | 20 | 10 |
| As, ppm | <10 | 4 | 8 |
| F, ppm | 18000 | 1700 | 99 |
| Heavy Metal (as Pb), ppm | <20 (Water-Soluble) | <20 | <10 |
| $SO_4$, % | 7.4 | 1.7 | 0.45 |
| Chloride, % | 0.13 | 0.027 | 0.39 |
| Na, % | 0.29 | 0.068 | 9.0 |
| % $P_2O_5$ recovered | N/A | N/A | 88 |

Example 6

Recovery of Ammonium Chloride

After separating the SAP crystals in Example 5, the mother liquor (Solution 121N) had the following composition:

| $P_2O_5$, % | 1.4% |
|---|---|
| $NH_4$, % | 3.9% |
| Fe, ppm | 6 ppm |
| $SO_4$, % | 1.8% |
| As, ppm | <2 ppm |
| F, ppm | 1700 ppm |
| Chloride, % | 2.1% |
| Na, % | 1.3% |

800 grams of solution 121N was concentrated to 238 grams by evaporation. The resulting slurry was cooled to 30° C. The slurry was centrifuged, and 32 grams of ammonium chloride with the following purity was recovered:

| $NH_4$, % | 32 |
|---|---|
| Cl, % | 63 |
| $P_2O_5$ % | 0.4 |
| Na, % | 0.5 |
| $SO_4$, % | 0.7 |
| Moisture, % | 4 |

This is above 95% ammonium chloride on a dry basis.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letter Patent of the United States is:

1. A method of producing sodium ammonium phosphate, comprising:
   (i) dissolving fertilizer grade diammonium phosphate in a reaction medium;
   (ii) reacting said fertilizer grade diammonium phosphate dissolved in said reaction medium with sodium chloride; and
   (iii) isolating formed sodium ammonium phosphate.

2. The method of claim 1, wherein said reaction medium comprises water.

3. The process of claim 2, wherein said diammonium phosphate is dissolved in an amount providing a $P_2O_5$ content of from 4% to 25%.

4. The method of claim 3, wherein said $P_2O_5$ content is from 8% to 20%.

5. The method of claim 1, wherein said isolating step comprises crystallizing the sodium ammonium phosphate to form sodium ammonium phosphate crystals, then separating said sodium ammonium phosphate crystals from the remainder of the reaction medium.

6. The method of claim 5, wherein said separating comprises the step of centrifuging or filtering the sodium ammonium phosphate crystals.

7. The method of claim 6, wherein said crystallizing is conducted at a temperature of from −10° to 40° C.

8. The method of claim 7, wherein said crystallizing is conducted at a temperature of from −10° to 20° C.

9. The method of claim 1, further comprising the step of filtering or clarifying said fertilizer grade diammonium phosphate dissolved in said reaction medium prior to said reacting step.

10. The method of claim 1, wherein said reacting step is conducted at a temperature of from 10° C. to the boiling point of the reaction medium.

11. The method of claim 10, wherein said temperature is from 30° C. to 60° C.

12. The method of claim 1, wherein said ammonium phosphate and said sodium chloride are present in amounts providing a molar ratio of Na to P of from 0.25:1 to 3:1.

13. The method of claim 12, wherein said molar ratio is from 0.8:1 to 1.2:1.

14. The method of claim 1, wherein said formed sodium ammonium phosphate is technical grade sodium ammonium phosphate.

15. The method of claim 1, further comprising the step of adjusting the pH to a value of from 7 to 12, after said reacting step and prior to said isolating step.

16. The method of claim 15, wherein said adjusting comprises adding ammonia, NaOH, $Na_2CO_3$ or a mixture thereof to said ammonium phosphate and said sodium chloride.

17. The method of claim 1, wherein said sodium chloride is rock salt or sea salt, said reaction medium comprises water, and said method further comprises the step of filtering the aqueous solution of diammonium phosphate and sodium chloride prior to said isolating step.

18. The method of claim 1, wherein said isolating comprises separating the formed sodium ammonium phosphate from a mother liquor, and the method further comprises the step of concentrating said mother liquor to recover ammonium chloride.

19. The method of claim 18, further comprising the step of recycling the concentrated mother liquor to the reaction medium.

20. A method of producing a liquid fertilizer, comprising the method of claim 18, and further comprising the step of isolating the concentrated mother liquor to produce said liquid fertilizer.

21. The method of claim 1, further comprising recovering formed ammonium chloride by evaporation and crystallization with or without other purification step(s) before or after evaporation.

22. The method of claim 1, wherein said fertilizer grade diammonium phosphate is grade 18-46-0.

23. The method of claim 1, wherein said step (i) of dissolving and said step (ii) of reacting are conducted concurrently.

24. The method of claim 1, wherein said sodium chloride is solid sodium chloride.

25. The method of claim 1 wherein said sodium chloride is a solution of sodium chloride.

26. A method of producing sodium ammonium phosphate, comprising:
   (i) mixing sodium chloride with fertilizer grade diammonium phosphate in a reaction medium;
   (ii) filtering or decanting said reaction medium;
   (iii) isolating formed sodium ammonium phosphate; and
   (iv) recovering formed ammonium chloride by evaporation and crystallization with or without other purification step(s) before or after evaporation.

27. The method of claim 26, wherein said fertilizer grade diammonium phosphate is grade 18-46-0.

28. A method of producing food grade sodium phosphate, comprising:
   (i) dissolving fertilizer grade diammonium phosphate in a reaction medium;
   (ii) reacting said fertilizer grade diammonium phosphate dissolved in said reaction medium with sodium chloride;
   (iii) isolating formed sodium ammonium phosphate; and
   (iv) reacting said isolated sodium ammonium phosphate with an alkali metal hydroxide, without having to purify said sodium ammonium phosphate to remove As, F or heavy metal impurities.

* * * * *